US012210691B2

(12) United States Patent
Tham et al.

(10) Patent No.: US 12,210,691 B2
(45) Date of Patent: Jan. 28, 2025

(54) SMART RING FOR MANIPULATING VIRTUAL OBJECTS DISPLAYED BY A WEARABLE DEVICE

(71) Applicants: Yu Jiang Tham, Seattle, WA (US); Jonathan M. Rodriguez, II, La Habra, CA (US); Nir Daube, Pacific Palisades, CA (US)

(72) Inventors: Yu Jiang Tham, Seattle, WA (US); Jonathan M. Rodriguez, II, La Habra, CA (US); Nir Daube, Pacific Palisades, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/138,565

(22) Filed: Apr. 24, 2023

(65) Prior Publication Data

US 2023/0259220 A1    Aug. 17, 2023

Related U.S. Application Data

(63) Continuation of application No. 17/557,859, filed on Dec. 21, 2021, now Pat. No. 11,747,915, which is a
(Continued)

(51) Int. Cl.
*G06F 3/0346* (2013.01)
*G06F 3/0354* (2013.01)
(Continued)

(52) U.S. Cl.
CPC ........ *G06F 3/0346* (2013.01); *G06F 3/03547* (2013.01); *G06F 3/0383* (2013.01);
(Continued)

(58) Field of Classification Search
CPC .......... H04N 21/42224; G06F 3/03543; G06F 3/03547; G06F 3/04883; G06F 3/0482;
(Continued)

(56) References Cited

U.S. PATENT DOCUMENTS 6,028,271 A * 2/2000 Gillespie ............. G06F 3/03547
178/18.06
6,323,846 B1   11/2001 Westerman et al.
(Continued)

FOREIGN PATENT DOCUMENTS

CN        106199511 A    12/2016
EP          3116615 A1     1/2017
(Continued)

OTHER PUBLICATIONS

Cas and Chary VR: https://www.youtube.com/watch?v=_8VqQfrHG94 , viewed on Dec. 4, 2021, published online on Feb. 25, 2020 (Year: 2020).
(Continued)

*Primary Examiner* — Koosha Sharifi-Tafreshi
(74) *Attorney, Agent, or Firm* — CM Law; Stephen J. Weed

(57) ABSTRACT

Systems, devices, media, and methods are presented for using a handheld device such as a ring to manipulate a virtual object being displayed by a wearable device such as eyewear. The path of the virtual object in motion is substantially linked, in time and space, to the course traveled by a hand holding the handheld device. The methods in some implementations include presenting the virtual object on a display at a first location relative to a three-dimensional coordinate system, collecting motion data from an inertial measurement unit on the handheld device, displaying the virtual object at a second location along a path based on the motion data. In some implementations the eyewear includes a projector located and configured to project the display onto a lens assembly.

12 Claims, 13 Drawing Sheets

Related U.S. Application Data continuation of application No. 17/007,047, filed on Aug. 31, 2020, now Pat. No. 11,275,453.

(60) Provisional application No. 62/907,805, filed on Sep. 30, 2019.

(51) Int. Cl.
*G06F 3/038* (2013.01)
*G06F 3/04842* (2022.01)
*G09G 5/373* (2006.01)

(52) U.S. Cl.
CPC ......... *G06F 3/04842* (2013.01); *G09G 5/373* (2013.01); *G06F 2203/0331* (2013.01); *G09G 2340/045* (2013.01); *G09G 2354/00* (2013.01)

(58) Field of Classification Search
CPC .. G06F 3/04812; G06F 3/011; G06F 3/04842; G06F 3/03545; G06F 3/0395; G06F 3/0486; G06F 3/0488; G06F 3/04886
See application file for complete search history.

(56) References Cited

U.S. PATENT DOCUMENTS

| | | |
|---|---|---|
| 8,799,821 B1 | 8/2014 | Rose et al. |
| 9,024,842 B1 | 5/2015 | Gomez et al. |
| 9,098,739 B2 | 8/2015 | Mutto et al. |
| 9,207,771 B2 | 12/2015 | Antoniac |
| 9,235,051 B2 | 1/2016 | Salter et al. |
| 9,459,454 B1 | 10/2016 | The et al. |
| 9,541,996 B1 | 1/2017 | Baxter et al. |
| 9,552,673 B2 | 1/2017 | Hilliges et al. |
| 9,671,566 B2 | 6/2017 | Abovitz et al. |
| 9,990,029 B2 | 6/2018 | Kochi |
| 9,996,983 B2 | 6/2018 | Mullins |
| 10,057,400 B1 | 8/2018 | Gordon et al. |
| 10,146,414 B2 | 12/2018 | Heater |
| 10,180,714 B1 | 1/2019 | Kin et al. |
| 10,220,303 B1 | 3/2019 | Schmidt et al. |
| 10,288,419 B2 | 5/2019 | Abovitz et al. |
| 10,311,833 B1 | 6/2019 | Qiu et al. |
| 10,372,228 B2 | 8/2019 | Mao et al. |
| 10,394,334 B2 | 8/2019 | Wang |
| 10,429,923 B1 | 10/2019 | Johnston et al. |
| 10,509,461 B2 | 12/2019 | Mullen |
| 10,579,207 B2 | 3/2020 | Piya et al. |
| 10,642,369 B2 | 5/2020 | Iyer et al. |
| 10,782,779 B1 | 9/2020 | Eubank et al. |
| 10,852,838 B2 | 12/2020 | Bradski et al. |
| 10,853,991 B1 | 12/2020 | Yan et al. |
| 10,866,093 B2 | 12/2020 | Abovitz et al. |
| 10,902,250 B2 | 1/2021 | Konin et al. |
| 10,909,762 B2 | 2/2021 | Karalis et al. |
| 10,928,975 B2 * | 2/2021 | Wang .................... G06F 1/1694 |
| 10,936,080 B2 | 3/2021 | Marcolina et al. |
| 11,003,307 B1 | 5/2021 | Ravasz et al. |
| 11,086,126 B1 | 8/2021 | Gollier et al. |
| 11,275,453 B1 | 3/2022 | Tham et al. |
| 11,277,597 B1 | 3/2022 | Canberk et al. |
| 11,294,472 B2 | 4/2022 | Tang et al. |
| 11,320,911 B2 | 5/2022 | Schwarz et al. |
| 11,334,179 B2 | 5/2022 | Li et al. |
| 11,380,021 B2 | 7/2022 | Nakata |
| 11,481,025 B2 | 10/2022 | Shimizu et al. |
| 11,494,000 B2 | 11/2022 | Katz et al. |
| 11,500,512 B2 | 11/2022 | Reithmeir et al. |
| 11,520,399 B2 | 12/2022 | Kang et al. |
| 11,531,402 B1 | 12/2022 | Stolzenberg |
| 11,546,505 B2 | 1/2023 | Canberk |
| 11,631,228 B2 | 4/2023 | Fieldman |
| 2003/0156756 A1 | 8/2003 | Gokturk et al. |
| 2005/0271279 A1 | 12/2005 | Fujimura et al. |
| 2007/0220108 A1 | 9/2007 | Whitaker |
| 2008/0219502 A1 | 9/2008 | Shamaie |
| 2009/0119609 A1 * | 5/2009 | Matsumoto ........... G06F 3/0482 715/769 |
| 2010/0085317 A1 | 4/2010 | Park et al. |
| 2010/0309140 A1 | 12/2010 | Widgor |
| 2011/0213664 A1 | 9/2011 | Osterhout et al. |
| 2012/0027252 A1 | 2/2012 | Liu et al. |
| 2012/0027263 A1 | 2/2012 | Liu et al. |
| 2012/0056730 A1 * | 3/2012 | Ujiie ................ H04N 21/42224 340/12.22 |
| 2012/0086729 A1 | 4/2012 | Baseley et al. |
| 2012/0113223 A1 | 5/2012 | Hilliges et al. |
| 2012/0194644 A1 | 8/2012 | Newcombe et al. |
| 2012/0327117 A1 | 12/2012 | Weller et al. |
| 2013/0145320 A1 * | 6/2013 | Oosterholt .......... G06F 3/04842 715/823 |
| 2013/0328927 A1 | 12/2013 | Mount et al. |
| 2013/0335324 A1 | 12/2013 | Kaplan et al. |
| 2014/0043211 A1 | 2/2014 | Park |
| 2014/0212000 A1 | 7/2014 | Yagcioglu et al. |
| 2014/0225918 A1 | 8/2014 | Mittal et al. |
| 2014/0298266 A1 | 10/2014 | Lapp |
| 2014/0306993 A1 | 10/2014 | Poulos et al. |
| 2014/0347289 A1 | 11/2014 | Suh et al. |
| 2014/0361988 A1 | 12/2014 | Katz et al. |
| 2014/0368533 A1 | 12/2014 | Salter et al. |
| 2015/0049017 A1 | 2/2015 | Weber et al. |
| 2015/0073753 A1 | 3/2015 | Rameau |
| 2015/0091824 A1 | 4/2015 | Hori |
| 2015/0097719 A1 | 4/2015 | Balachandreswaran et al. |
| 2015/0109197 A1 | 4/2015 | Takagi |
| 2015/0169176 A1 | 6/2015 | Cohen et al. |
| 2015/0199780 A1 | 7/2015 | Beyk |
| 2015/0269783 A1 | 9/2015 | Yun |
| 2015/0317833 A1 | 11/2015 | Ebstyne et al. |
| 2015/0331576 A1 | 11/2015 | Piya et al. |
| 2015/0370321 A1 | 12/2015 | Lundberg |
| 2016/0033770 A1 | 2/2016 | Fujimaki et al. |
| 2016/0035134 A1 | 2/2016 | Tanaka et al. |
| 2016/0098093 A1 | 4/2016 | Cheon et al. |
| 2016/0260251 A1 | 9/2016 | Stafford et al. |
| 2016/0261834 A1 | 9/2016 | Li et al. |
| 2016/0306431 A1 | 10/2016 | Stafford et al. |
| 2017/0003746 A1 | 1/2017 | Anglin et al. |
| 2017/0014683 A1 | 1/2017 | Maruyama et al. |
| 2017/0028299 A1 | 2/2017 | The et al. |
| 2017/0053383 A1 | 2/2017 | Heo |
| 2017/0053447 A1 | 2/2017 | Chen et al. |
| 2017/0097687 A1 | 4/2017 | Pinault et al. |
| 2017/0123487 A1 | 5/2017 | Hazra et al. |
| 2017/0124713 A1 | 5/2017 | Jurgenson et al. |
| 2017/0140552 A1 | 5/2017 | Woo et al. |
| 2017/0235372 A1 * | 8/2017 | Song .................... G06V 10/235 345/158 |
| 2017/0270711 A1 | 9/2017 | Schoenberg |
| 2017/0293364 A1 | 10/2017 | Wang |
| 2017/0295446 A1 | 10/2017 | Shivappa |
| 2017/0323488 A1 | 11/2017 | Mott et al. |
| 2017/0352184 A1 | 12/2017 | Poulos et al. |
| 2017/0357334 A1 | 12/2017 | Balan et al. |
| 2018/0005443 A1 | 1/2018 | Poulos et al. |
| 2018/0024641 A1 | 1/2018 | Mao et al. |
| 2018/0039852 A1 | 2/2018 | Nakamura et al. |
| 2018/0075659 A1 | 3/2018 | Browy et al. |
| 2018/0196503 A1 | 7/2018 | Ikeda et al. |
| 2018/0259775 A1 | 9/2018 | Ono et al. |
| 2018/0329209 A1 | 11/2018 | Nattukallingal |
| 2019/0025595 A1 | 1/2019 | Fukuda et al. |
| 2019/0025931 A1 | 1/2019 | Anderson et al. |
| 2019/0102927 A1 | 4/2019 | Yokokawa |
| 2019/0122085 A1 | 4/2019 | Tout et al. |
| 2019/0139320 A1 | 5/2019 | Davies et al. |
| 2019/0146598 A1 | 5/2019 | Peri |
| 2019/0155394 A1 | 5/2019 | Bedikian et al. |
| 2019/0167352 A1 | 6/2019 | Mahfouz |
| 2019/0220098 A1 | 7/2019 | Gupta |
| 2019/0251696 A1 | 8/2019 | Wang et al. |
| 2019/0299059 A1 | 10/2019 | Case, Jr. et al. |
| 2019/0318544 A1 | 10/2019 | Skidmore et al. |

(56) References Cited

U.S. PATENT DOCUMENTS

| | | | |
|---|---|---|---|
| 2019/0324553 A1 | 10/2019 | Liu et al. | |
| 2019/0325651 A1 | 10/2019 | Bradner et al. | |
| 2019/0361521 A1 | 11/2019 | Stellmach et al. | |
| 2019/0362562 A1 | 11/2019 | Benson | |
| 2019/0377416 A1 | 12/2019 | Alexander | |
| 2019/0385371 A1* | 12/2019 | Joyce | G02B 27/0172 |
| 2020/0005026 A1 | 1/2020 | Andersen et al. | |
| 2020/0064924 A1 | 2/2020 | Poupyrev et al. | |
| 2020/0097065 A1 | 3/2020 | Iyer et al. | |
| 2020/0151900 A1 | 5/2020 | Weising et al. | |
| 2020/0218423 A1 | 7/2020 | Ohashi | |
| 2020/0311396 A1 | 10/2020 | Pollefeys et al. | |
| 2020/0312029 A1 | 10/2020 | Heinen et al. | |
| 2020/0387228 A1 | 12/2020 | Ravasz et al. | |
| 2021/0019036 A1 | 1/2021 | Wang et al. | |
| 2021/0026455 A1 | 1/2021 | Dash et al. | |
| 2021/0041702 A1 | 2/2021 | Kimura et al. | |
| 2021/0090337 A1 | 3/2021 | Ravasz et al. | |
| 2021/0096726 A1 | 4/2021 | Faulkner et al. | |
| 2021/0174519 A1 | 6/2021 | Bazarevsky et al. | |
| 2021/0181938 A1 | 6/2021 | Hassan et al. | |
| 2021/0183158 A1 | 6/2021 | Korngold et al. | |
| 2021/0208698 A1* | 7/2021 | Martin | G06F 3/012 |
| 2021/0209153 A1 | 7/2021 | Zhang | |
| 2021/0263593 A1 | 8/2021 | Lacey | |
| 2021/0275914 A1 | 9/2021 | Wu et al. | |
| 2021/0286502 A1 | 9/2021 | Lemay et al. | |
| 2021/0334524 A1 | 10/2021 | Guo et al. | |
| 2021/0373650 A1 | 12/2021 | Kang et al. | |
| 2021/0397266 A1 | 12/2021 | Gupta et al. | |
| 2022/0088476 A1 | 3/2022 | Canberk et al. | |
| 2022/0103748 A1 | 3/2022 | Canberk | |
| 2022/0139056 A1 | 5/2022 | Fieldman | |
| 2022/0171479 A1 | 6/2022 | Chappaz et al. | |
| 2022/0179495 A1 | 6/2022 | Agrawal et al. | |
| 2022/0206102 A1 | 6/2022 | Brown | |
| 2022/0206588 A1 | 6/2022 | Canberk et al. | |
| 2022/0326781 A1 | 10/2022 | Hwang et al. | |
| 2022/0334649 A1 | 10/2022 | Hwang et al. | |
| 2023/0082789 A1 | 3/2023 | Lu et al. | |
| 2023/0117197 A1 | 4/2023 | Stolzenberg | |
| 2023/0274511 A1 | 8/2023 | Miller et al. | |

FOREIGN PATENT DOCUMENTS

| | | | | |
|---|---|---|---|---|
| EP | 3699736 A1 | | 8/2020 | |
| KR | 100793834 B1 | * | 12/2006 | G06F 3/014 |
| WO | 2015192117 A1 | | 12/2015 | |

OTHER PUBLICATIONS

Chatain, Julia et al., "DigiGlo: Exploring the Palm as an Input and Display Mechanism through Digital Gloves," Association for Computing Machinery, Chi Play '20, Nov. 2-4, 2020, Virtual Event, Canada, 12 pages.

Cirulis Arnis: "Large Scale Augmented Reality for Collaborative Environments", Jul. 10, 2020 (Jul. 10, 2020), Computer Vision—ECCV 2020 : 16th European Conference, Glasgow, UK, Aug. 23-28, 2020 : Proceedings; [Lecture Notes in Computer Science ; ISSN 0302-9743], Springer International Publishing, Cham, pp. 325-335, XP047554326, ISBN: 978-3-030-58594-5.

Engadget: "Google Glass Gesture Recognition by OnTheGo Platforms at CES 2014 : Engadget", Jan. 8, 2014 (Jan. 8, 2014), XP055859805, Retrieved from the Internet: URL: https://www.youtube.com/watch?v=d_jl_ZxPECg [retrieved on Nov. 11, 2021] 00:39s, 00:55s, 01:00-01:10s.

Google Atap: "Welcome to Project Soli", published May 29, 2015, XP055903745, Retrieved from the Internet: URL: https://www.youtube.com/watch?v=OQNiZf SsPc0&t=61s [retrieved on Mar. 21, 2022].

International Search Report and Written Opinion for International Application No. PCT/US2021/033642, dated Aug. 30, 2021 (Aug. 30, 2021)—11 pages.

International Search Report and Written Opinion for International Application No. PCT/US2021/051109, dated Dec. 10, 2021 (Dec. 10, 2021)—17 pages.

International Search Report and Written Opinion for International Application No. PCT/US2021/063295, dated Mar. 17, 2022 (Mar. 17, 2022)—13 pages.

International Search Report and Written Opinion for International Application No. PCT/US2021/063340, dated Apr. 4, 2022 (Apr. 5, 2022)—10 pages.

International Search Report and Written Opinion for International Application No. PCT/US2022/023608, dated Jul. 11, 2022 (Jul. 11, 2022)—12 pages.

International Search Report and Written Opinion for International Application No. PCT/US2022/024565, dated Jul. 25, 2022 (Jul. 25, 2022)—15 pages.

Matthias Schwaller et al: "Pointing in the Air: Measuring the Effect of Hand Selection Strategies on Performance and Effort", Jul. 1, 2013 (Jul. 1, 2013), Human Factors in Computing and Informatics, Springer Berlin Heidelberg, Berlin, Heidelberg, pp. 732-747, XP047033542, ISBN: 978-3-642-39061-6, p. 740; figure 4.

Partial International Search Report and Written Opinion for International Application No. PCT/US2021/047637, dated Jan. 7, 2022 (Jan. 7, 2022)—10 pages.

Song, Chen, "Sensor Fusion for Learning-based Tracking of Controller Movement in Virtual Reality". Sep. 2019, IEEE, pp. 1-5. (Year: 2019).

U.S. Appl. No. 16/865,995, filed May 4, 2020 to Canberk, et al.

U.S. Appl. No. 17/588,934, filed Jan. 31, 2022 to Stolzenberg, et al.

1st European Office Action for European Application No. 21773937.4 dated May 2, 2024, 6 pages.

2nd European Office Action for European Application No. 21795131.8 dated Oct. 25, 2024, 7 pages.

* cited by examiner

SMART RING FOR MANIPULATING VIRTUAL OBJECTS DISPLAYED BY A WEARABLE DEVICE

CROSS-REFERENCE TO RELATED APPLICATIONS

This application is a Continuation of U.S. application Ser. No. 17/557,859 filed on Dec. 21, 2021, which is a Continuation of U.S. patent application Ser. No. 17/007,047 filed on Aug. 31, 2020, now U.S. Pat. No. 11,275,453, and claims priority to U.S. Provisional Application Ser. No. 62/907,805 filed on Sep. 30, 2019, the contents of all of which are incorporated fully herein by reference.

TECHNICAL FIELD

Examples set forth in the present disclosure relate to portable electronic devices, including wearable devices such as eyewear. More particularly, but not by way of limitation, the present disclosure describes systems and methods for manipulating a virtual object based on the motion of a handheld electronic device such as a ring.

BACKGROUND

Many types of computers and electronic devices available today, including mobile devices (e.g., smartphones, tablets, and laptops), handheld devices (e.g., smart rings), and wearable devices (e.g., smartglasses, digital eyewear, headwear, headgear, and head-mounted displays), include internal sensors for collecting information about the location, orientation, motion, and heading of the device.

Augmented reality refers to the technology that overlays one or more virtual images onto a user's view of a real-world, physical environment. The virtual images may include data, information, text, characters, objects, or other things suitable for display.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
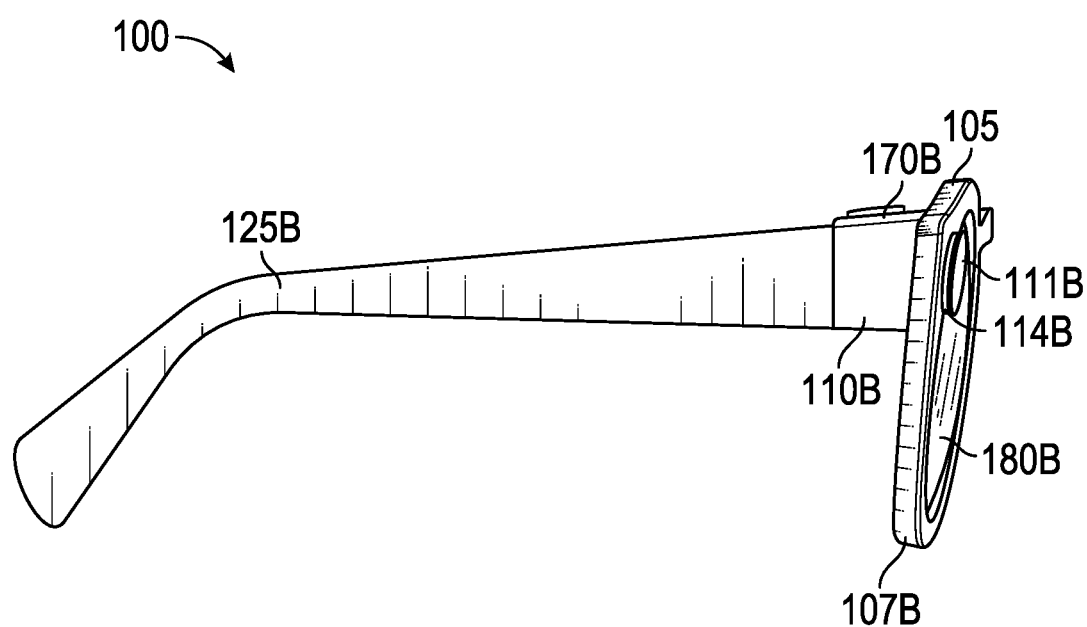
FIG. 1A is a side view (right) of an example hardware configuration of an eyewear device that may be utilized in a virtual object manipulation system.

Various implementations and details are described with reference to an example: a virtual object manipulation system for presenting a virtual object on a display at a first location along a path (e.g., projected onto at least one lens assembly of a portable eyewear device), collecting motion data associated with a course traveled by a hand in motion holding a handheld device (e.g., a ring), and displaying the virtual object at a second location based on the collected motion data. The path of the virtual object is substantially linked to the course traveled by the handheld device. In addition to the virtual object manipulation system, the systems and methods described herein may be applied to and used with any of a variety of systems, especially those in which a user desires to select and manipulate a virtual object using a handheld device in a physical environment that is displayed by a wearable device.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "coupled" or "connected" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The orientations of the eyewear device, the handheld device, associated components and any other complete devices incorporating a camera or an inertial measurement unit such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 utilized in a virtual object manipulation system, as described herein, which shows a right visible-light camera 114B for gathering image information. As further described below, two cameras 114A, 114B capture image information for a scene from two separate viewpoints. The two captured images may be used to project a three-dimensional display onto a screen for viewing with 3D glasses.

The eyewear device 100 includes a right optical assembly 180B with an image display to present images, such as depth images. As shown in FIGS. 1A and 1, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right chunk 110B. As shown in FIGS. 1C-D, the eyewear device 100 also includes a left visible-light camera 114A.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 813. Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible-light cameras 114A, 114B have a field of view with an angle of view between 15° to 30°, for example 24°, and have a resolution of 480×480 pixels. The "angle of coverage" describes the angle range that a lens of visible-light cameras 114A, 114B or infrared camera 220 (see FIG. 2A) can effectively image. Typically, the camera lens produces an image circle that is large enough to cover the film or sensor of the camera completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The left and right raw images captured by respective visible-light cameras 114A, 114B are in the two-dimensional space domain and comprise a matrix of pixels on a two-dimensional coordinate system that includes an X-axis for horizontal position and a Y-axis for vertical position. Each pixel includes a color attribute value (e.g., a red pixel light value, a green pixel light value, a blue pixel light value, or a combination thereof); and a position attribute (e.g., an X-axis coordinate and a Y-axis coordinate).

In order to capture stereo images for later display as a three-dimensional projection, the image processor 912 (shown in FIG. 4) may be coupled to the visible-light cameras 114A, 114B to receive and store the visual image information. A timestamp for each image may be added by the image processor 912 or another processor which controls operation of the visible-light cameras 114A, 114B, which act as a stereo camera to simulate human binocular vision. The timestamp on each pair of images allows the images to be displayed together as part of a three-dimensional projection. Three-dimensional projections create an immersive, life-like experience that is desirable in a variety of contexts, including virtual reality (VR) and video gaming.

Figure 3:
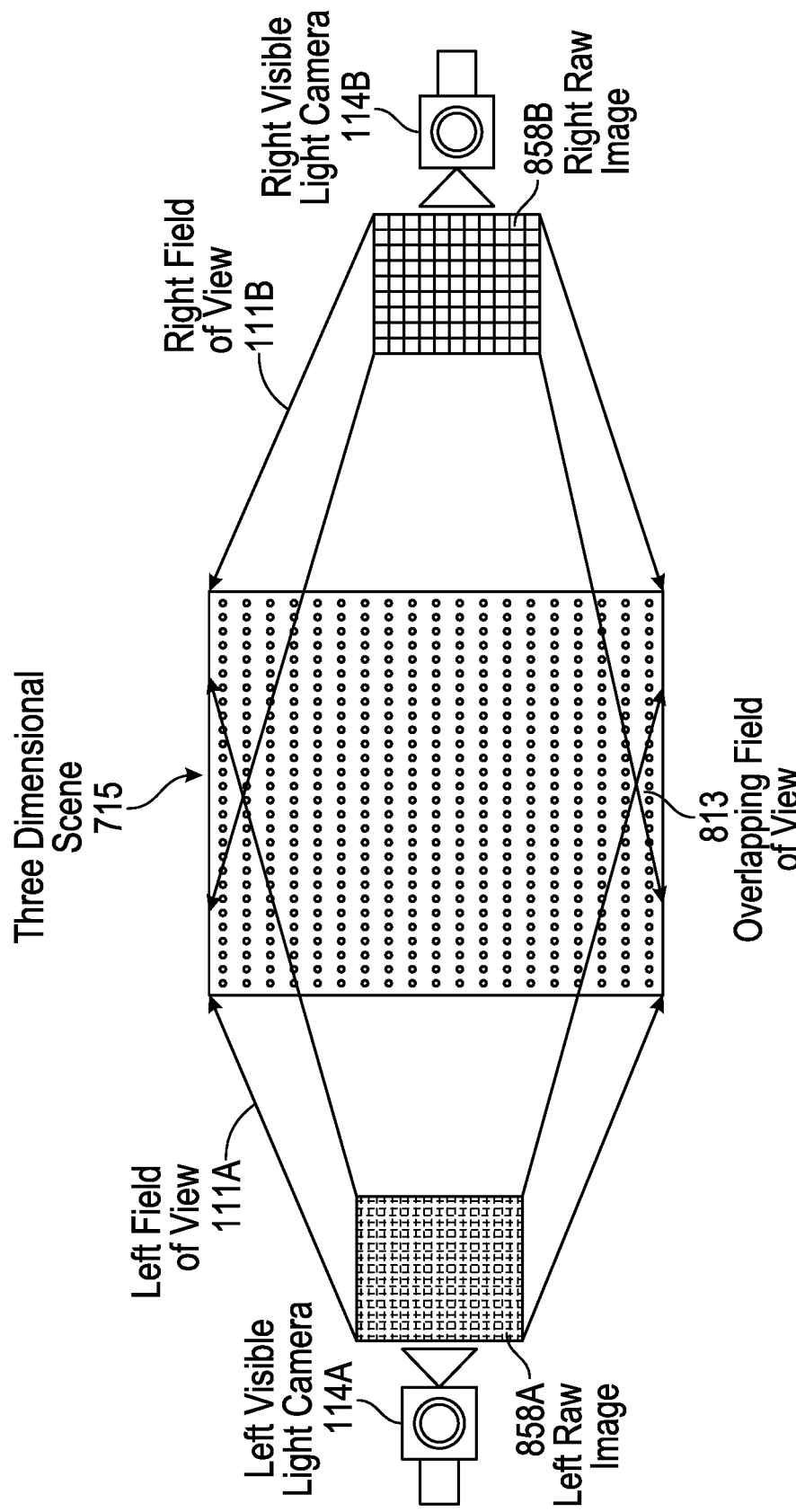
FIG. 3 is a diagrammatic depiction of a three-dimensional scene, a left raw image captured by a left visible-light camera, and a right raw image captured by a right visible-light camera.

FIG. 3 is a diagrammatic depiction of a three-dimensional scene 715, a left raw image 858A captured by a left visible-light camera 114A, and a right raw image 858B captured by a right visible-light camera 114B. The left field of view 111A may overlap, as shown, with the right field of view 111B. The overlapping field of view 813 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 858A, 858B may be processed to include a timestamp, which allows the images to be displayed together as part of a three-dimensional projection.

For the capture of stereo images, as illustrated in FIG. 3, a pair of raw red, green, and blue (RGB) images are captured of a real scene 715 at a given moment in time—a left raw image 858A captured by the left camera 114A and right raw image 858B captured by the right camera 114B. When the pair of raw images 858A, 858B are processed (e.g., by the image processor 912), depth images are generated. The generated depth images may be viewed on an optical assembly 180A, 180B of an eyewear device, on another display (e.g., the image display 880 on a mobile device 890), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, a blue pixel light value, or a combination thereof); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the virtual object manipulation system 1000 includes the eyewear device 100, which includes a frame 105 and a left temple 110A extending from a left lateral side 170A of the frame 105 and a right temple 110B extending from a right lateral side 170B of the frame 105. The eyewear device 100 may further include at least two visible-light cameras 114A, 114B which may have overlapping fields of view. In one example, the eyewear device 100 includes a left visible-light camera 114A with a left field of view 111A, as illustrated in FIG. 3. The left camera 114A is connected to the frame 105 or the left temple 110A to capture a left raw image 858A from the left side of scene 715. The eyewear device 100 further includes a right visible-light camera 114B with a right field of view 111B. The right camera 114B is connected to the frame 105 or the right temple 110B to capture a right raw image 858B from the right side of scene 715.

Figure 1B:
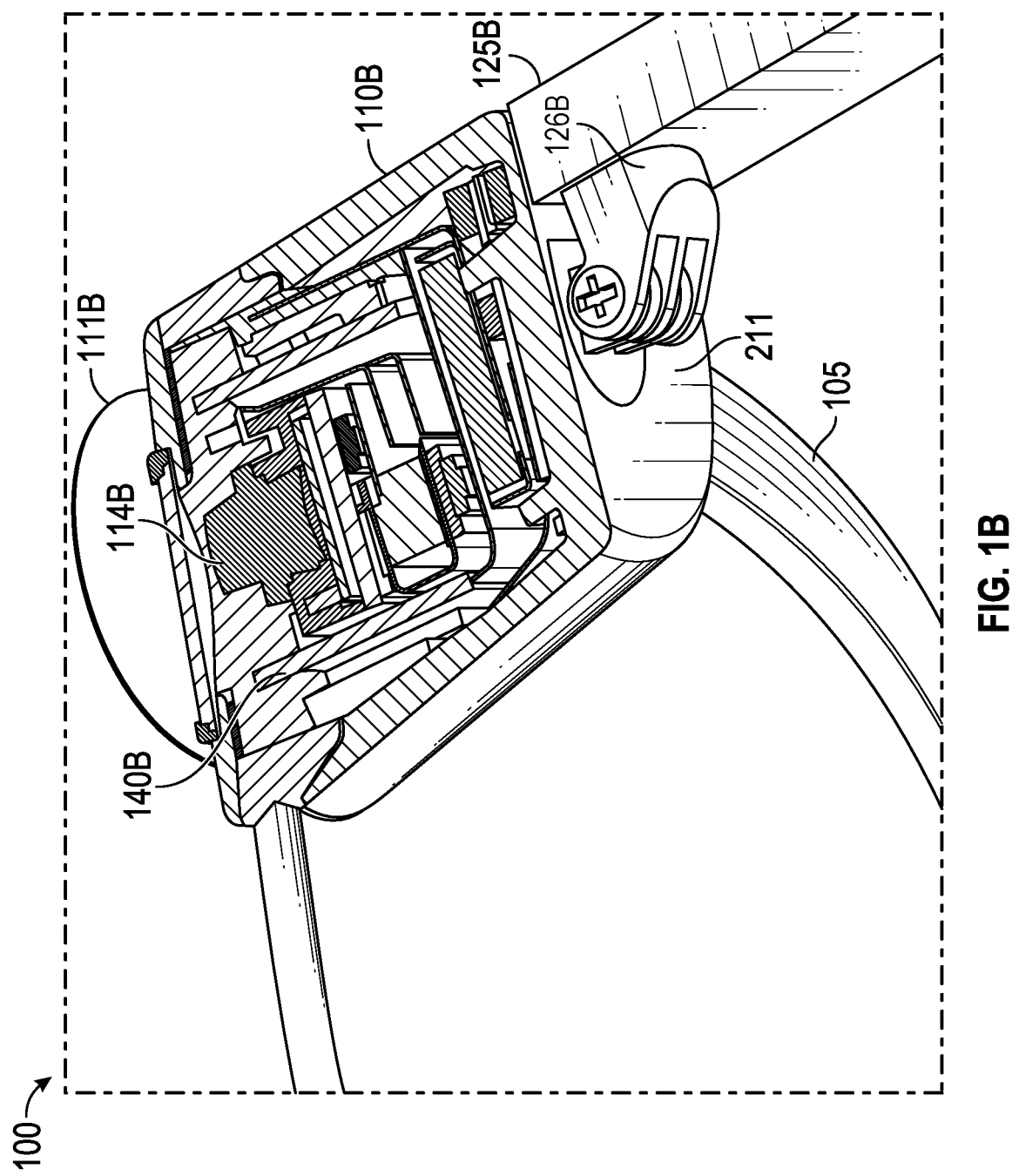
FIG. 1B is a top, partly sectional view of a right chunk of the eyewear device of FIG. 1A depicting a right visible-light camera, and a circuit board.
Figure 1C:
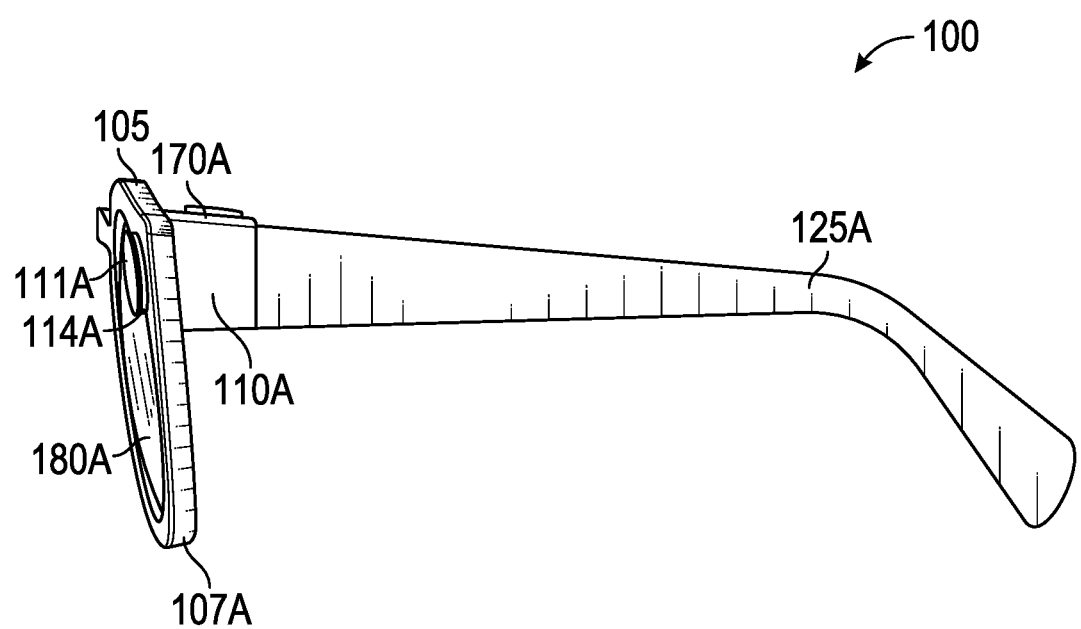
FIG. 1C is a side view (left) of an example hardware configuration of the eyewear device of FIG. 1A, which shows a left visible-light camera.
Figure 1D:
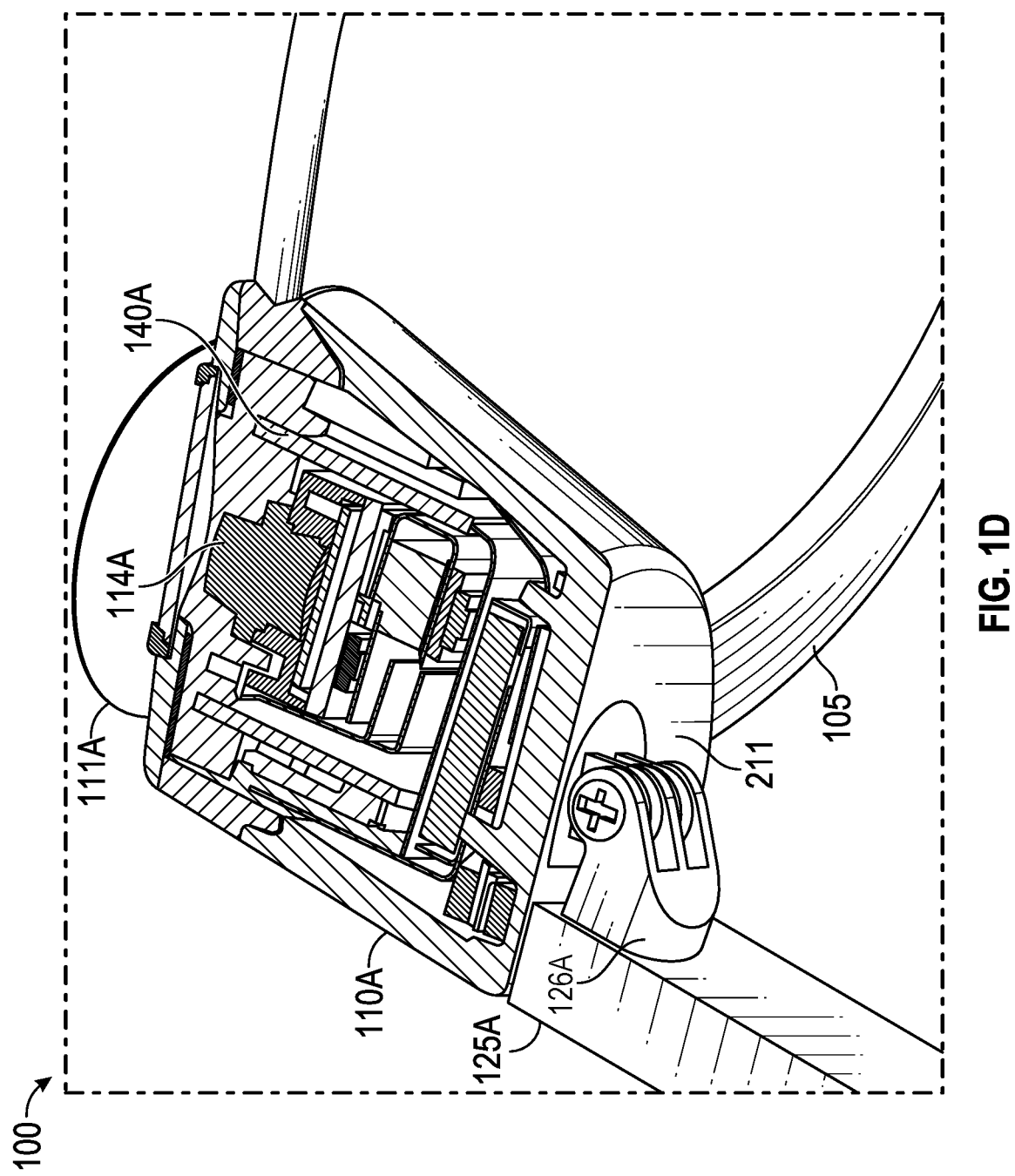
FIG. 1D is a top, partly sectional view of a left chunk of the eyewear device of FIG. 1C depicting the left visible-light camera, and a circuit board.

FIG. 1B is a top cross-sectional view of a right chunk 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a top cross-sectional view of a left chunk 110A of the eyewear device of FIG. 1C depicting the left visible-light camera 114A of the three-dimensional camera, and a circuit board. Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right chunk 110B to a right temple 125B of the eyewear device 100. The left hinge 126A connects the left chunk 110A to a left temple 125A of the eyewear device 100. In some examples, components of the visible-light cameras 114A, B, the flexible PCBs 140A, B, or other electrical connectors or contacts may be located on the temples 125A, B or the hinge 126A, B.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via WiFi).

Figure 2A:
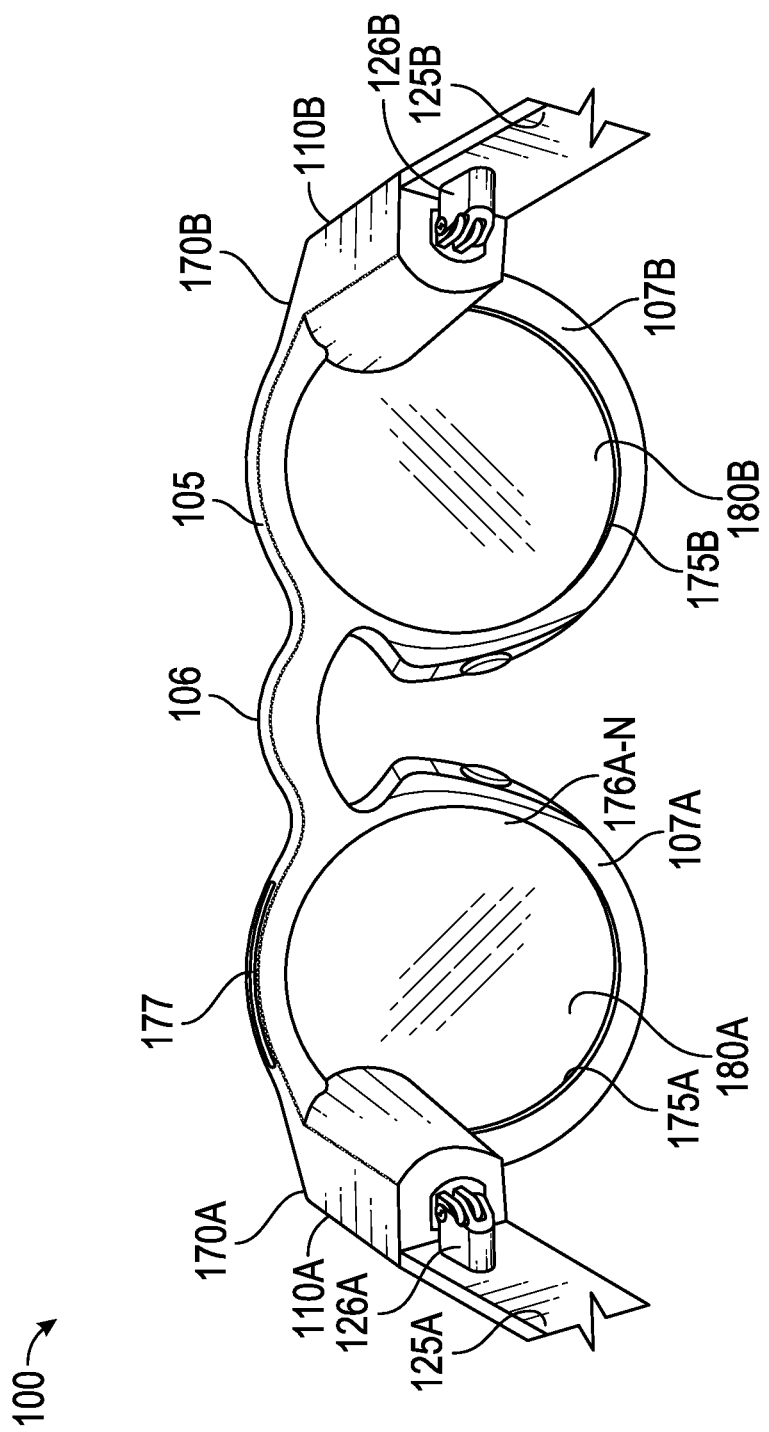
FIGS. 2A and 2B are rear views of example hardware configurations of an eyewear device utilized in the virtual object manipulation system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right chunk 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right chunk 110B in which an opening is formed with an outward-facing angle of coverage, but in a different outwardly direction. The coupling can also be indirect via intervening components.

As shown in FIG. 1B, flexible PCB 140B is disposed inside the right chunk 110B and is coupled to one or more other components housed in the right chunk 110B. Although shown as being formed on the circuit boards of the right chunk 110B, the right visible-light camera 114B can be formed on the circuit boards of the left chunk 110A, the temples 125A, 125B, or the frame 105.

Figure 2B:
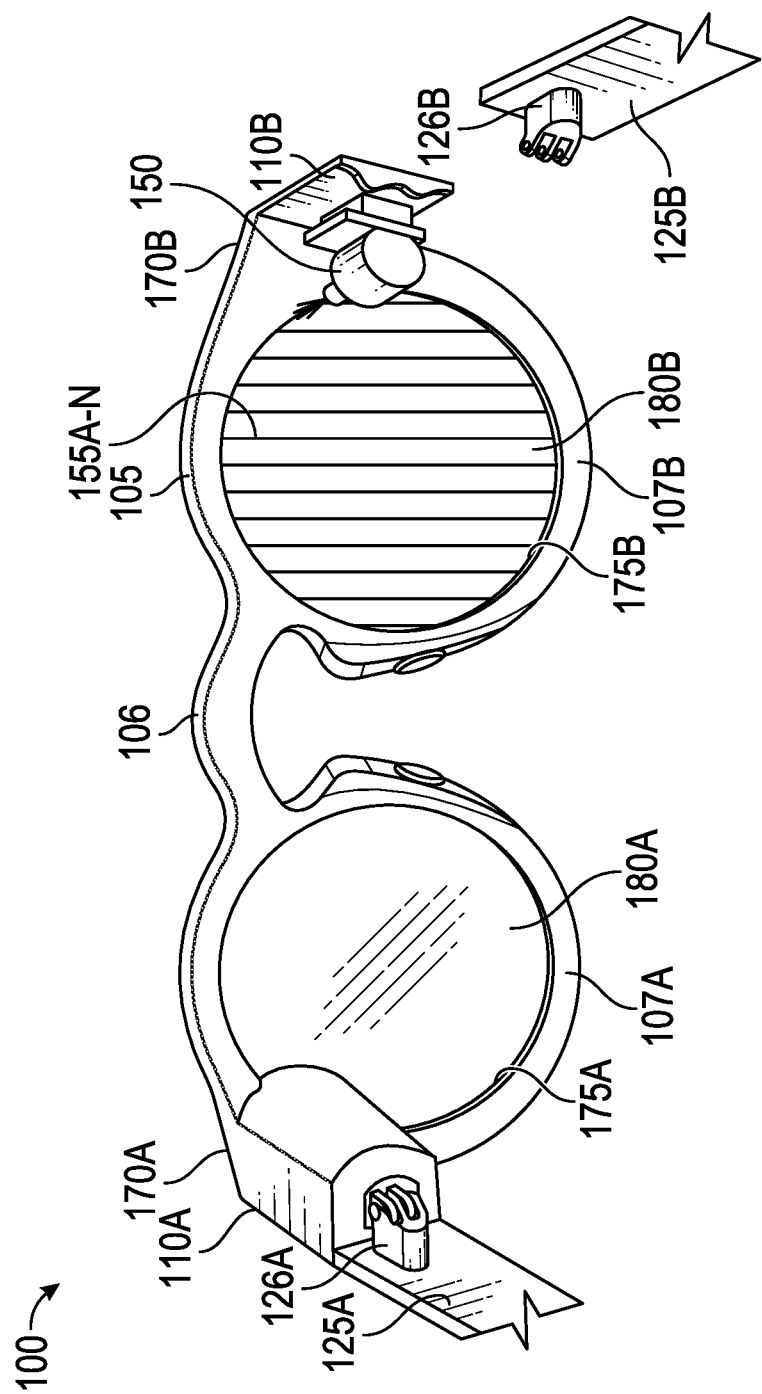

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A, 110B may be integrated into the frame 105 on the respective sides 170A, 170B (as illustrated) or implemented as separate components attached to the frame 105 on the respective sides 170A, 170B. Alternatively, the chunks 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 912 on the eyewear device 100 may execute programming to apply the voltage to the LCD layer in order to create an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left chunk 110A adjacent the left lateral side 170A of the frame 105 and a right chunk 110B adjacent the right lateral side 170B of the frame 105. The chunks 110A, 110B may be integrated into the frame 105 on the respective lateral sides 170A, 170B (as illustrated) or implemented as separate components attached to the frame 105 on the respective sides 170A, 170B. Alternatively, the chunks 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double-prime, A through N, not shown) which are configured to interact with light from the right projector 150B. In this example, the eyewear device 100 includes a left display and a right display.

Figure 4:
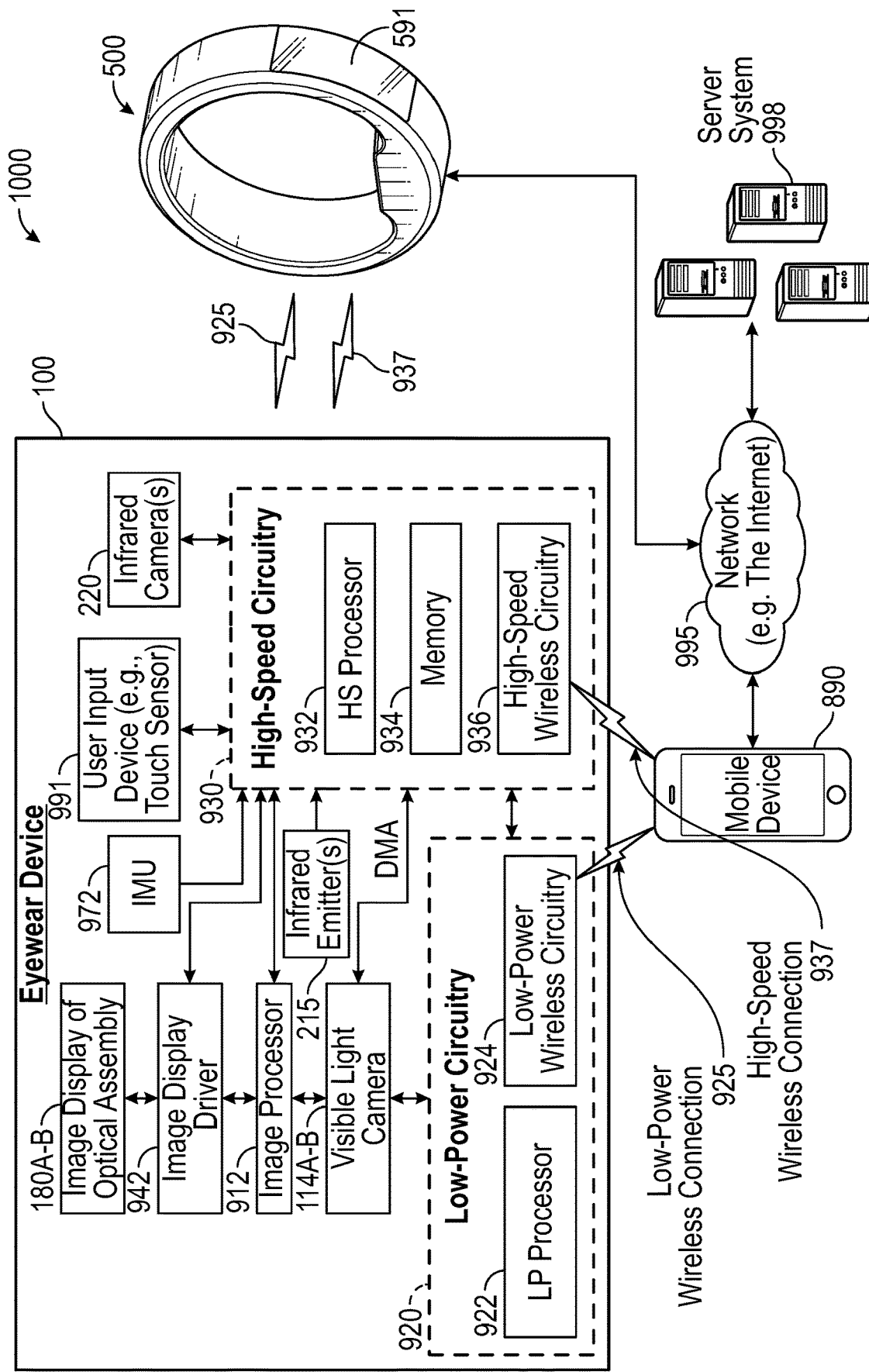
FIG. 4 is a functional block diagram of an example virtual object manipulation system including a wearable device (e.g., an eyewear device), a mobile device, a handheld device (e.g., a smart ring), and a server system connected via various networks.

FIG. 4 is a functional block diagram of an example virtual object manipulation system 1000 including a wearable device 100 (e.g., an eyewear device), a mobile device 890, a handheld device 500 (e.g., a ring), and a server system 998 connected via various networks 995 such as the Internet. The system 1000 includes a low-power wireless connection 925 and a high-speed wireless connection 937 between the eyewear device 100 and a mobile device 890—and between the eyewear device 100 and the ring 500—as shown.

The eyewear device 100 includes one or more visible-light cameras 114A, 114B which may be capable of capturing still images or video, as described herein. The cameras 114A, 114B may have a direct memory access (DMA) to high-speed circuitry 930. A pair of cameras 114A, 114B may function as a stereo camera, as described herein. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 220.

The eyewear device 100 further includes two image displays of each optical assembly 180A, 180B (one associated with the left side 170A and one associated with the right side 170B). The eyewear device 100 also includes an image display driver 942, an image processor 912, low-power circuitry 920, and high-speed circuitry 930. The image displays of each optical assembly 180A, 180B are for presenting images, including still images and video. The image display driver 942 is coupled to the image displays of each optical assembly 180A, 180B in order to control the images displayed. The eyewear device 100 further includes a user input device 991 (e.g., a touch sensor or touchpad) to receive a two-dimensional input selection from a user.

The components shown in FIG. 4 for the eyewear device 100 are located on one or more circuit boards, for example a PCB or flexible PCB, located in the rims or temples. Alternatively, or additionally, the depicted components can be located in the chunks, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 930 includes a high-speed processor 932, a memory 934, and high-speed wireless circuitry 936. In the example, the image display driver 942 is coupled to the high-speed circuitry 930 and operated by the high-speed processor 932 in order to drive the left and right image displays of each optical assembly 180A, 180B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 100 and the operating system is stored in memory 934 for execution. In addition to any other responsibilities, the high-speed processor 932 executes a software architecture for the eyewear device 100 that is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

The low-power circuitry 920 includes a low-power processor 922 and low-power wireless circuitry 924. The low-power wireless circuitry 924 and the high-speed wireless circuitry 936 of the eyewear device 100 can include short range transceivers (Bluetooth™) and wireless wide, local, or wide-area network transceivers (e.g., cellular or WiFi). Mobile device 890, including the transceivers communicating via the low-power wireless connection 925 and the high-speed wireless connection 937, may be implemented using details of the architecture of the eyewear device 100, as can other elements of the network 995.

Memory 934 includes any storage device capable of storing various data and applications, including, among other things, camera data generated by the left and right visible-light cameras 114A, 114B, the infrared camera(s) 220, the image processor 912, and images generated for display by the image display driver 942 on the image display of each optical assembly 180A, 180B. Although the memory 934 is shown as integrated with high-speed circuitry 930, the memory 934 in other examples may be an independent, standalone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Figure 5:
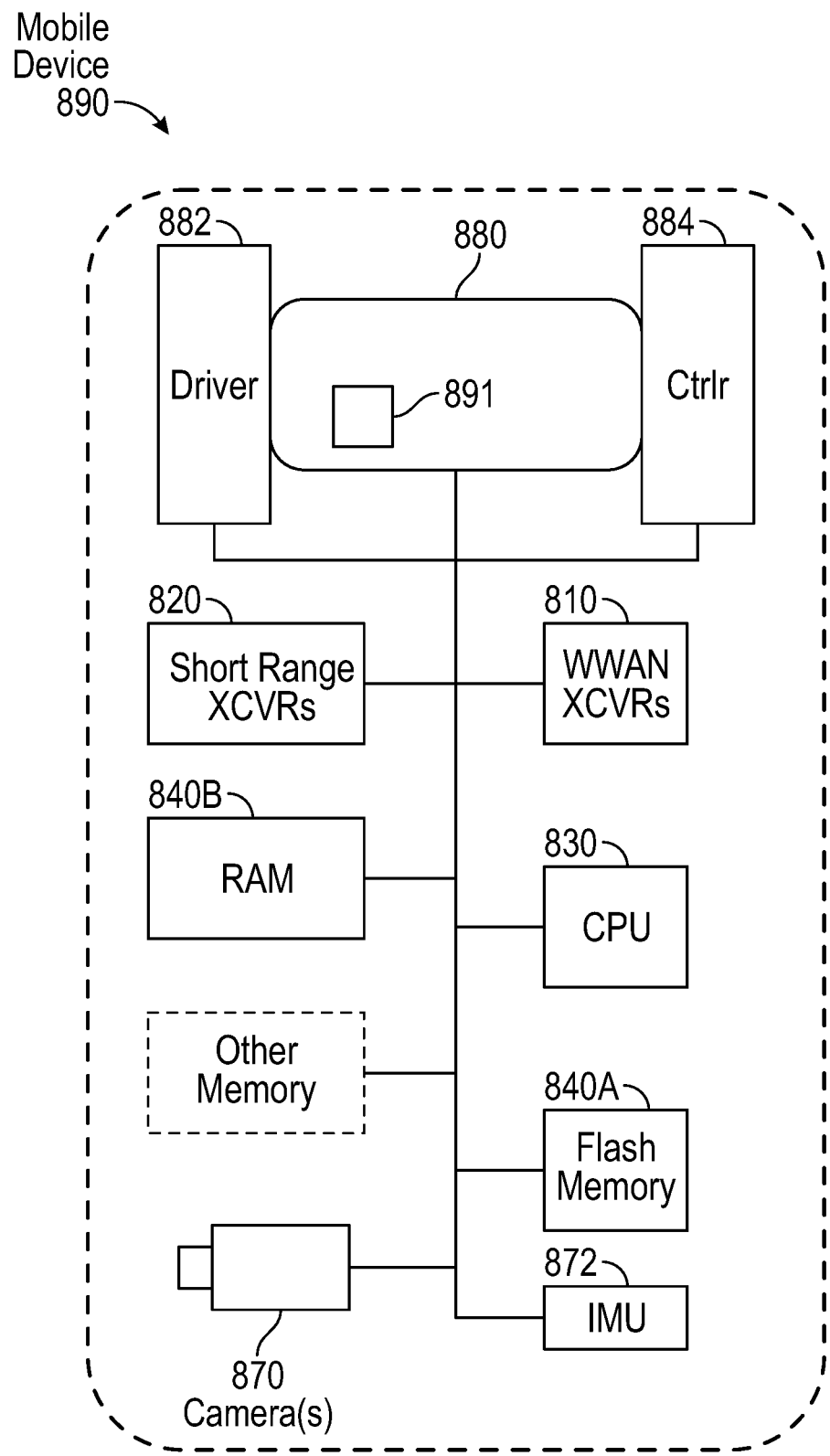
FIG. 5 is a diagrammatic representation of an example hardware configuration for a mobile device of the virtual object manipulation system of FIG. 4.

As shown in FIG. 4, the high-speed processor 932 of the eyewear device 100 can be coupled to the camera system (visible-light cameras 114A, 114B), the image display driver 942, the user input device 991, and the memory 934. As shown in FIG. 5, the CPU 830 of the mobile device 890 may be coupled to a camera system 870, a mobile display driver 882, a user input layer 891, and a memory 840A. The eyewear device 100 can perform all or a subset of any of the functions described herein which result from the execution of the virtual object manipulation system in the memory 934 by the processor 932 of the eyewear device 100. The mobile device 890 can perform all or a subset of any of the functions described herein which result from the execution of the virtual object manipulation system in the flash memory 840A by the CPU 830 of the mobile device 890. Functions can be divided in the virtual object manipulation system such that the ring 500 collects raw data from the IMU 872 and sends it to the eyewear device 100 which performs the displaying, comparing, and composing functions.

The server system 998 may be one or more computing devices as part of a service or network computing system, for example, that include a processor, a memory, and network communication interface to communicate over the network 995 with an eyewear device 100 and a mobile device 890.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 942. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a loudspeaker positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location or force of touches or touch gestures, or other tactile-configured elements), and audio input components (e.g., a microphone), and the like. The mobile device 890 and the server system 998 may include alphanumeric, pointer-based, tactile, audio, and other input components.

In some examples, the eyewear device 100 includes a collection of motion-sensing components referred to as an inertial measurement unit 972. The motion-sensing components may be micro-electro-mechanical systems (MEMS) with microscopic moving parts, often small enough to be part of a microchip. The inertial measurement unit (IMU) 972 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS receiver, one or more transceivers to generate relative position coordinates, altitude sensors or barometers, and other orientation sensors. Such positioning system coordinates can also be received over the wireless connections 925, 937 from the mobile device 890 via the low-power wireless circuitry 924 or the high-speed wireless circuitry 936.

The IMU 972 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 934 and executed by the high-speed processor 932 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

The virtual object manipulation system 1000, as shown in FIG. 4, includes a computing device, such as mobile device 890, coupled to an eyewear device 100 and to a handheld device or ring 500 over a network. The eyewear device 100, as described herein, includes an inertial measurement unit 972 for collecting data about the position, orientation, and motion of the eyewear device 100.

Figure 6:
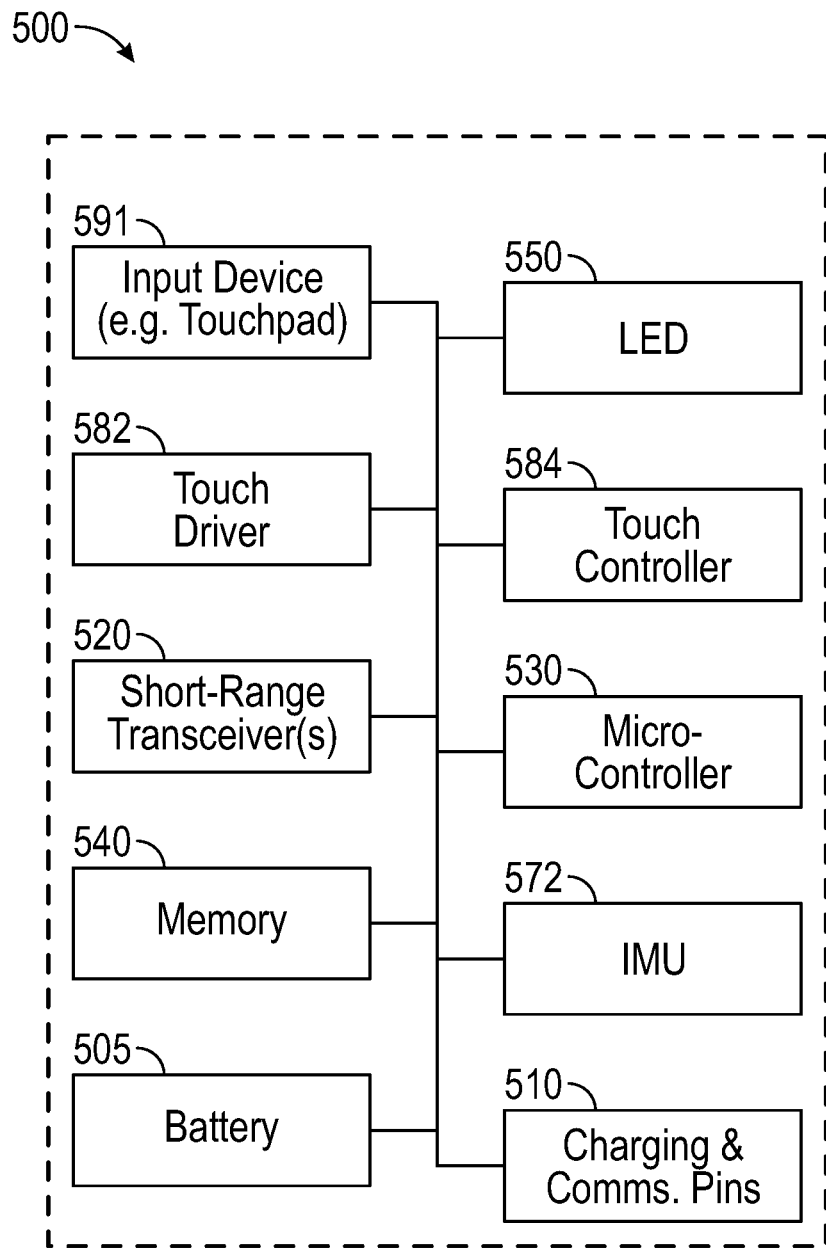
FIG. 6 is a diagrammatic representation of an example hardware configuration for a handheld device (e.g., a smart ring) of the virtual object manipulation system of FIG. 4.

The virtual object manipulation system 1000 further includes a memory for storing instructions (including those in the virtual object manipulation system) and a processor for executing the instructions. Execution of the instructions of the virtual object manipulation system by the processor 932 configures the eyewear device 100 to cooperate with the ring 500 and manipulate a virtual object. The system 1000 may utilize the memory 934 of the eyewear device 100 or the memory elements 840A, 840B of the mobile device 890 (FIG. 5) or the memory 540 of the ring 500 (FIG. 6). Also, the system 1000 may utilize the processor elements 932, 922 of the eyewear device 100 or the central processing unit (CPU) 830 of the mobile device 890 (FIG. 5) or the microcontroller 530 of the ring 500 (FIG. 6). Furthermore, the system 1000 may further utilize the memory and processor elements of the server system 998. In this aspect, the memory and processing functions of the virtual object manipulation system 1000 can be shared or distributed across the eyewear device 100, the mobile device 890, the ring 500, or the server system 998.

The mobile device 890 may be a smartphone, tablet, laptop computer, access point, or any other such device capable of connecting with eyewear device 100 using both a low-power wireless connection 925 and a high-speed wireless connection 937. Mobile device 890 is connected to server system 998 and network 995. The network 995 may include any combination of wired and wireless connections.

FIG. 5 is a high-level functional block diagram of an example mobile device 890. Mobile device 890 includes a flash memory 840A which includes programming to perform all or a subset of the functions described herein. Mobile device 890 may include a camera 870 that comprises at least two visible-light cameras (first and second visible-light cameras with overlapping fields of view) or at least one visible-light camera and a depth sensor with substantially overlapping fields of view. Flash memory 840A may further include multiple images or video, which are generated via the camera 870.

As shown, the mobile device 890 includes an image display 880, a mobile display driver 882 to control the image display 880, and a controller 884. In the example of FIG. 4, the image display 880 includes a user input layer 891 (e.g., a touchscreen) that is layered on top of or otherwise integrated into the screen used by the image display 880.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 890 with a user interface that includes a touchscreen input layer 891 for receiving input (by touch, multi-touch, or gesture, and the like, by hand, stylus or other tool) and an image display 880 for displaying content As shown in FIG. 4, the mobile device 890 includes at least one digital transceiver (XCVR) 810, shown as WWAN XCVRs, for digital wireless communications via a wide-area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (i.e., the network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web-related inputs, and various types of mobile message communications to/from the mobile device 890.

The mobile device 890 further includes a microprocessor that functions as a central processing unit (CPU); shown as CPU 830 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 830, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 830 or processor hardware in smartphone, laptop computer, and tablet.

The CPU 830 serves as a programmable host controller for the mobile device 890 by configuring the mobile device 890 to perform various operations, for example, in accordance with instructions or programming executable by CPU 830. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 890 includes a memory or storage system, for storing programming and data. In the example, the memory system may include a flash memory 840A, a random-access memory (RAM) 840B, and other memory components, as needed. The RAM 840B serves as short-term storage for instructions and data being handled by the CPU 830, e.g., as a working data processing memory. The flash memory 840A typically provides longer-term storage.

Hence, in the example of mobile device 890, the flash memory 840A is used to store programming or instructions for execution by the CPU 830. Depending on the type of device, the mobile device 890 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

FIG. 6 is a high-level functional block diagram of an example handheld device, such as a ring 500. The ring 500, as shown, includes an input device 591 (e.g., a touchpad), a lamp 550 (e.g., a light-emitting diode), a touch driver 582, a touch controller 584, a short-range transceiver 520, a microcontroller 530, a memory 540, an inertial measurement unit (IMU) 572, a battery 505, and one or more charging and communications pins 510.

The ring 500 includes at least one short-range transceiver 520 that is configured for short-range network communication, such as via NFC, VLC, DECT, ZigBee, Bluetooth™, BLE (Bluetooth Low-Energy), or WiFi. The short-range transceiver(s) 520 may take the form of any available two-way wireless local area network (WLAN) transceiver of a type that is compatible with one or more standard protocols of communication implemented in wireless local area networks, such as one of the Wi-Fi standards under IEEE 802.11.

The ring 500 may also include a global positioning system (GPS) receiver. Alternatively, or additionally, the ring 500 can utilize either or both the short-range transceiver(s) 520 for generating location coordinates for positioning. For example, cellular network, WiFi, or Bluetooth™ based positioning systems can generate very accurate location coordinates, particularly when used in combination. Such location coordinates can be transmitted to one or more eyewear devices 100, or to one or more mobile devices 890, over one or more network connections via the transceiver(s) 520.

The transceivers 520 (i.e., the network communication interface) conforms to one or more of the various digital wireless communication standards utilized by modern mobile networks. Examples of WWAN transceivers include but are not limited to transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 520 provide two-way wireless communication of information including digitized audio signals, still image and video signals, web page information for display as well as web-related inputs, and various types of mobile message communications to or from the ring 500.

The ring 500 further includes a microcontroller 530 that functions as a central processing unit (CPU) for the ring 500, as shown in FIG. 6. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the microprocessor. The microcontroller 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the microcontroller 530 or processor hardware in smartphone, laptop computer, and tablet.

The microcontroller 530 serves as a programmable host controller for the virtual object manipulation system 1000 by configuring the ring 500 to perform various operations; for example, in accordance with instructions or programming executable by the microcontroller 530. For example, such operations may include various general operations of the ring 500, as well as operations related to the programming for applications that reside on the ring 500. Although a processor may be configured by use of hardwired logic, typical processors in mobile devices are general processing circuits configured by execution of programming.

The ring 500 includes one or more memory elements 540 for storing programming and data. The memory 540 may include a flash memory, a random-access memory (RAM), or other memory elements, as needed. The memory 540 stores the programming and instructions needed to perform all or a subset of the functions described herein. The RAM, if present, may operate as short-term storage for instructions and data being handled by the microcontroller 530. Depending on the particular type of handheld device, the ring 500 stores and runs an operating system through which specific applications are executed. The operating system may be a mobile operating system, such as Google Android, Apple iOS, Windows Mobile, Amazon Fire OS, RIM BlackBerry OS, or the like.

In some examples, the ring 500 includes a collection of motion-sensing components referred to as an inertial measurement unit 572. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the ring 500 (including the acceleration due to gravity) relative to three orthogonal axes (x, y, z). The gyroscope senses the angular velocity of the ring 500 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the ring 500 relative to magnetic north. The position of the ring 500 may be determined by location sensors, such as a GPS receiver, one or more transceivers to generate relative position coordinates, altitude sensors or barometers, and other orientation sensors. Such positioning system coordinates can also be received over the wireless connections 925, 937 from the mobile device 890 via the low-power wireless circuitry 924 or the high-speed wireless circuitry 936.

The IMU 572 may include or cooperate with a digital motion processor or programming that gathers the raw data from the components and compute a number of useful values about the position, orientation, and motion of the ring 500. For example, the acceleration data gathered from the accelerometer can be integrated to obtain the velocity relative to each axis (x, y, z); and integrated again to obtain the position of the ring 500 (in linear coordinates, x, y, and z). The angular velocity data from the gyroscope can be integrated to obtain the position of the ring 500 (in spherical coordinates). The programming for computing these useful values may be stored in memory 934 and executed by the high-speed processor 932 of the eyewear device 100.

The ring 500 may optionally include additional peripheral sensors, such as biometric sensors, specialty sensors, or display elements integrated with the ring 500. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

Figure 7:
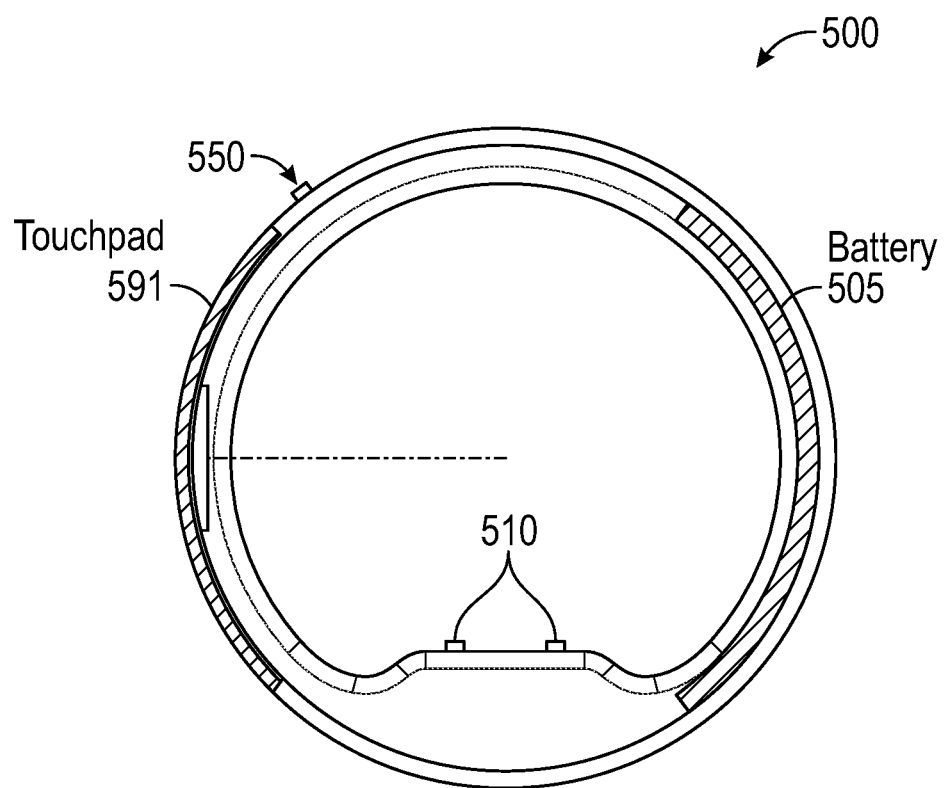
FIG. 7 is a schematic view of an example hardware configuration for a handheld device (e.g., a smart ring) of the virtual object manipulation system of FIG. 4.

FIG. 7 is a schematic view of an example hardware configuration for a ring 500. The touchpad 591, a shown, may be sized and shaped to conform closely to an outer surface of the ring 500. The ring 500 may also include an LED 550. The battery 505 may be sized and shaped to fit within the body of the ring 500, with connections to one or more charging and communications pins 510. As shown, the ring 500 may include an internal space (beneath the pins 510 in this example) to house a variety of components, such as a touch driver 582, a touch controller 584, a short-range transceiver 520, a microcontroller 530, a memory 540, and an inertial measurement unit (IMU) 572.

Figure 8:
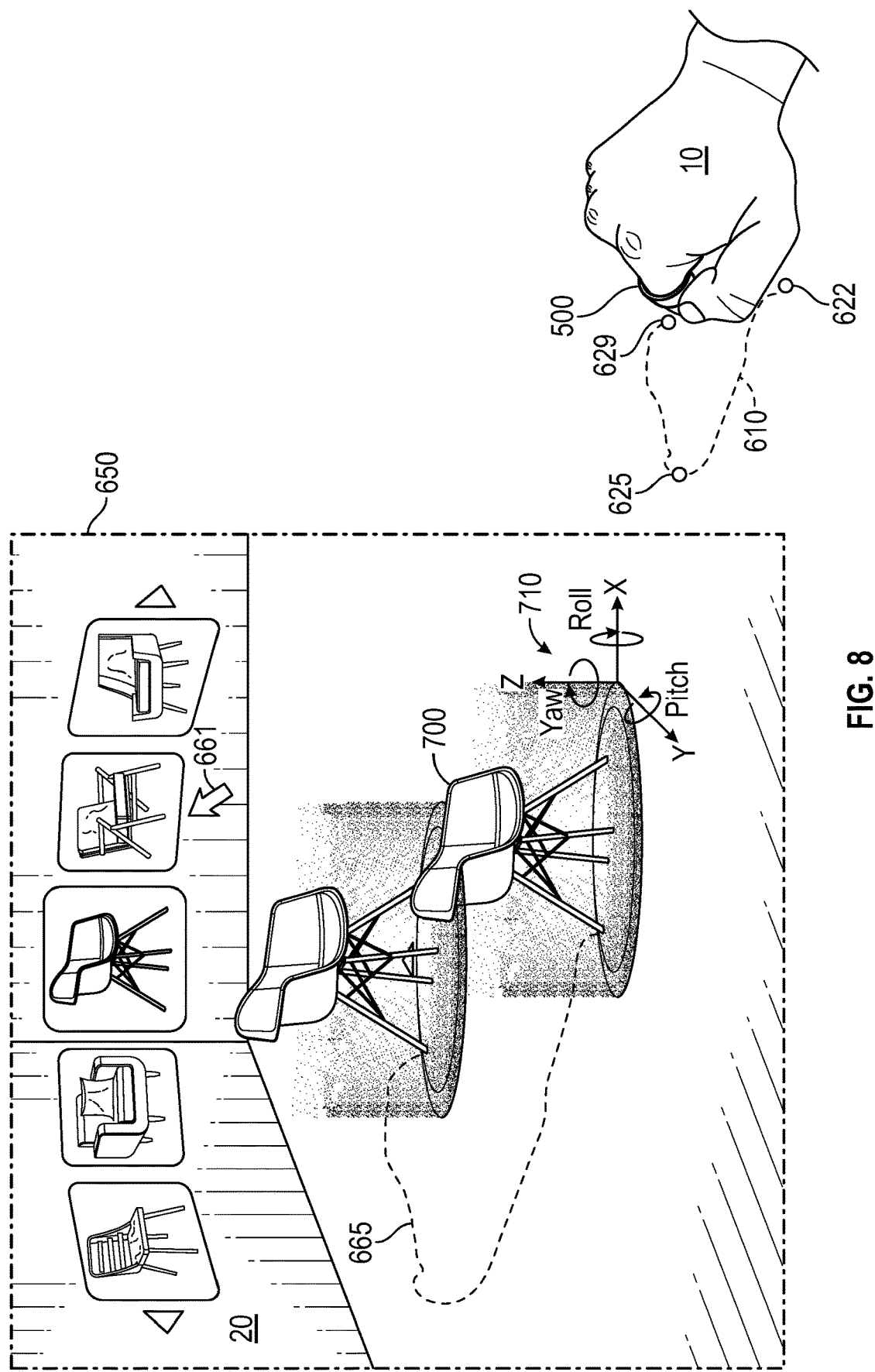
FIG. 8 is an illustration of a handheld device (e.g., a smart ring) moving along an example course and a virtual object moving along an example path, where the path is correlated with the course in near real-time, in the virtual object manipulation system of FIG. 4.

FIG. 8 is an illustration of a handheld device 500 (e.g., a ring) moving along an example course 610 and a virtual object 700 moving along an example path 665. The path 665 is correlated with the course 610 in near real-time, so that the virtual object 700 moves in close synchronization with the motion of the ring 500. In the example shown, the ring 500 is on the index finger of a hand 10. The thumb may or may not be engaged with the input device 591 (e.g., touchpad). In use, the hand 10 moves the ring 500 along a course 610 from a start location 622, by and past one or more intermediate locations 625, to a stop location 629. When the ring 500 is in motion along the course 610, the IMU 572 is collecting course data. The motion data includes information about the location, orientation, motion, heading, or a combination thereof of the ring 500 at each of a plurality of locations along the course 610.

The display 650 illustrated in FIG. 8, in some implementations, includes the physical environment 20, a cursor 661, and one or more virtual objects. In the example shown, the virtual object 700 has been selected from a number of candidate objects. The cursor 661 and virtual object 700 are presented in an overlay relative to the physical environment 20. The system 1000 in some examples includes a mathematically placed three-dimensional coordinate system 710 which may or may not appear on the display 650. In some implementations, the ring 500 and its IMU 572 collect and process data relative to the same three-dimensional coordinate system 710. The path 665 of the virtual object 700 has nearly the same shape as the course 610 traveled by the ring 500. When the ring 500 is in motion along the course 610, the motion data collected by the IMU 572 is used to display the virtual object 700, so that the path 665 of the virtual object 700 is closely correlated, in near real-time, with the course 610 traveled by the ring 500.

The display 650 in some implementations, is projected onto a surface, such as a head-mounted screen or onto at least one lens assembly (e.g., an optical element 180A, 180B of an eyewear device 100) as described herein. The eyewear device 100 may include a projector 150 (FIG. 2B) that is positioned and configured to project the physical environment 20, the cursor 661, and the virtual object 700 in motion along the path 665 onto at least one optical lens assembly (e.g., the right optical element 180B). In this implementation, the ring 500 cooperates with the eyewear device 100 to manipulate a virtual object 700.

The virtual object manipulation system 1000, as shown in FIG. 4, in some implementations, includes a handheld device (e.g., ring 500) and a portable device (e.g., eyewear 100). The ring 500 includes a microcontroller 530, an input device (e.g., touchpad 591), and an inertial measurement unit 572. The eyewear 100, which is in communication with the ring 500, includes a processor 932, a memory 934, and a display (e.g., the image display associated with at least one lens or optical assembly 180A, 180B).

In an example method of using the virtual object manipulation system 1000, one of the first steps is presenting the virtual object 700 on a display 650 that includes a physical environment 20 in the background. The virtual object 700 is displayed in a first location relative to a three-dimensional coordinate system 710. The display 650 is coupled to and supported by a wearable device, such as the eyewear device 100 described herein. The system 1000 collects motion data from an inertial measurement unit 572 that is coupled to and supported by a handheld device, such as a smart ring 500, that is in communication with the wearable device 100. The motion data is associated with a course 610 traveled by the handheld device 500 in motion relative to the three-dimensional coordinate system 710, as shown in FIG. 8. The system 1000 displays the virtual object 700 in a second location along the path 665 based on the motion data, so that the path 665 of the virtual object 700 is substantially linked, both in time and space, to the course 610 traveled by the handheld device 500. In use, the system 1000 displays the virtual object 700 at a plurality of second locations, in rapid succession, along the path 665 so that the virtual object 700 appears to move in direct correlation with the movement of the handheld device 500.

In some implementations, the wearable device is an eyewear device 100 that includes a memory 934, a processor 932, and at least one lens assembly 180A, 180B configured to both function as the display 650 and to facilitate viewing of the physical environment 20. As shown in FIG. 8, the system 1000 overlays the virtual object 700 onto the physical environment 20 within the display 650, so that the virtual object 700 is persistently viewable along the path 665 in the foreground, with the physical environment 20 in the background. Of course, the ring 500 may also be located in a position where it can be viewed by looking through the lens assembly 180A, 180B while at the same time viewing the virtual object 700 and the physical environment 20.

The virtual object 700 may move in a linear direction or in rotation relative to one or more axes of the coordinate system 710. The hand 10 moving the handheld device 500 can likewise move in a linear direction or in rotation. The inertial measurement unit 572 of the handheld device 500 in some implementations includes an accelerometer and a gyroscope. The IMU 572 inside the handheld device 500, in accordance with programming instructions stored in the memory 540, performs the step of collecting the motion data associated with the course 610 traveled by the hand 10 in motion. The motion data includes information from the IMU 572 about the location, orientation, motion, heading, or a combination thereof of the handheld device 500 at each of a plurality of locations along the course 610.

The step of collecting motion data can include collecting acceleration data from the accelerometer. More specifically, the handheld device 500 may collect from the accelerometer of the IMU 572 a second linear acceleration associated with the virtual object 700. Linear acceleration data can be used to derive or otherwise calculate a linear velocity, a position (x, y, z), or both. In some implementations, the eyewear device 100 includes a processor 932 and a memory 934. The process of displaying the virtual object 700 in a second location may further include the processor 932 computing the second location relative to the coordinate system 710, wherein the second location is based on the second linear acceleration. In this aspect, the virtual object 700 when displayed in the second location appears to move in translation along the path 665 (relative to at least one axis of the coordinate system 710).

The step of collecting motion data can also include collecting angular velocity data from the gyroscope. More specifically, the handheld device 500 may collect from the gyroscope of the IMU 572 a second angular velocity associated with the virtual object 700. Angular velocity data can be used to derive or otherwise calculate angular acceleration, a position (x, y, z), or both of the virtual object 700. In some implementations, the eyewear device 100 includes a processor 932 and a memory 934. The process of displaying the virtual object 700 in a second location may further include the processor 932 computing the second location relative to the coordinate system 710, wherein the second location is based on the second angular velocity. In this aspect, the virtual object 700 when displayed in the second location appears to move in rotation about at least one axis of the three-dimensional coordinate system 710.

Figure 9:
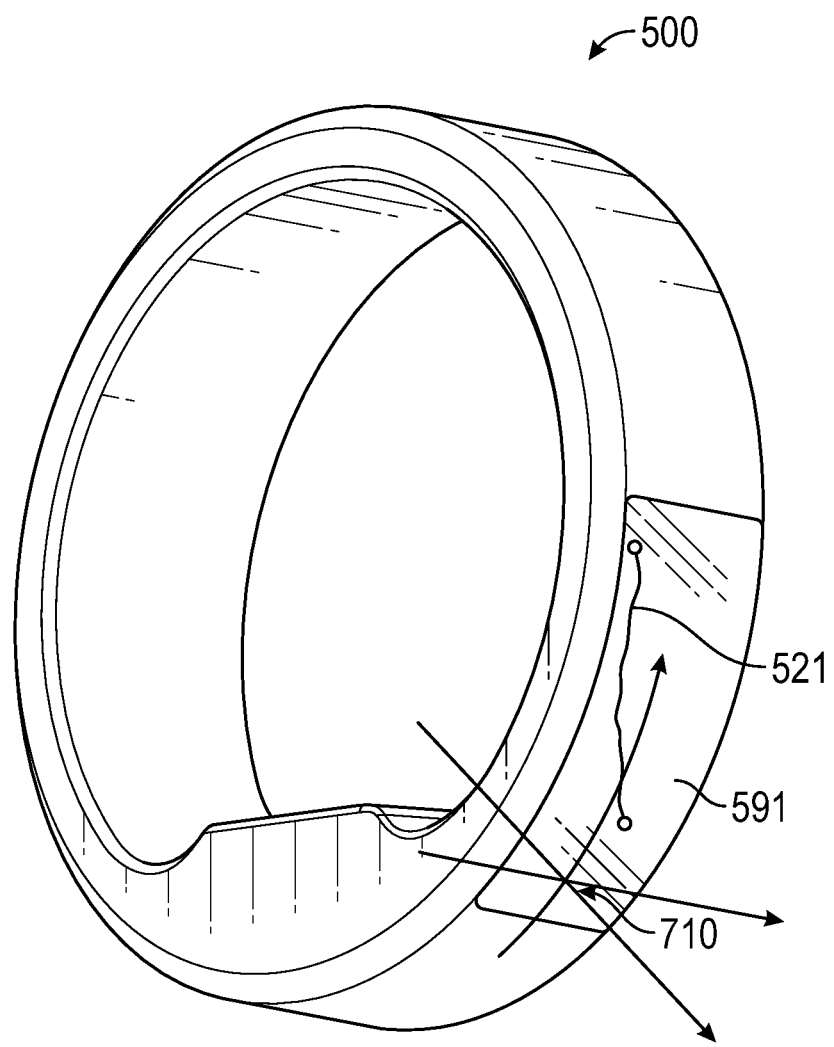
FIG. 9 is a perspective illustration of an example segment along an input device (e.g., a touchpad) of a handheld device (e.g., a smart ring), in the virtual object manipulation system of FIG. 4.

In another aspect of the method, in implementations where the handheld device 500 includes an input device 591 positioned along an outer surface of the handheld device, the method may include the step of collecting track data from the input device 591. The track data is associated with a segment 521 traversed by a finger along the input device. The segment 521 may be similar to a line segment, without meeting the geometrical definition of a line segment. The system 1000 in some implementations may detect the segment 521 and construct a best-fit line segment that approximates the segment 521 in length and heading. As shown in FIG. 9, the segment 521 has a length and a heading relative to a touchpad coordinate system 710. The process of displaying the virtual object 700 in a second location may further include the step of identifying the original size (first size) associated with the virtual object 700 when in the first location. The processor 932 calculates a magnification factor based on the length and heading of the segment 521. The magnification factor may include a value that is based on the length of the segment 521. The longer the segment 521, the higher the value. The magnification factor may include a sign (positive or negative) associated with the value. The sign is based on the heading of the segment 521, from start point to end point, relative to a touchpad coordinate system 710. For example, the system 1000 may establish a range of headings to be associated with a positive sign (which indicates the virtual object 700 should be enlarged in size) and another range of headings associated with a negative sign (which indicates the virtual object 700 should be reduced in size). The magnification factor, for example, may include a value of sixty (based on a segment length of two centimeters) and a sign that is positive (based on a heading of eighty degrees). In response, the virtual object 700 would be displayed at a second size that is sixty percent larger compared to the first size.

As shown in FIG. 8, the method in some implementations includes presenting a cursor 661 on the display 650 and moving the cursor 661 in response to the motion data collected from the handheld device 500. In this aspect, when starting the method, the first virtual element on the display 650 may be the cursor 661. The cursor 661 may appear at a default location relative to the environment 20. The cursor 661 is displayed along with a number of candidate objects. The user may want to select a particular virtual object 700 from among the candidate objects. When the cursor 661 is displayed near the desired virtual object 700, the method includes detecting a selection input from the input device 591 of the handheld device 500, so that the virtual object 700 is releasably selected by the handheld device 500 according to the user's selection input. The selection input may be a tap or other contact, a tap pattern such as a double tap, or a push or slide along the surface of the input device 591, in any of a variety of combinations. The selection input may include any of a variety of tap patterns, which may be set or established through a user interface associated with the ring 500.

The selection input may be used when only a single virtual object is presented on the display 650, instead of a number of candidate objects. In some implementations, an outline, highlight, or other indicia may be overlaid or otherwise added to the virtual object 700 when selected as a signal to the user that the path 665 of the virtual object 700 is now linked to the course 610 of the handheld device 500.

Starting and stopping the collecting of motion data associated with a course 610 and a selected virtual object 700, in some implementations, includes one or more particular inputs to the input device 591. For example, to start a course 610 for a new virtual object 700, the user in some implementations will press and hold thumb or finger on the input device 591 and, thus, engage the IMU 572 to begin and continue the process of collecting the motion data while moving the hand 10. The process of collecting motion data may continue until the system detects that the thumb or finger has been released from the input device 591.

In some implementations, the handheld device is a ring 500 that includes a memory 540, a microcontroller 530, and a touchpad 591 configured to function as the input device. The ring 500 may also include a touch driver 582, a touch controller 584, and a transceiver 520, as shown in FIG. 6. The microcontroller 530 can perform the step of collecting the track data from the touchpad 591. The microcontroller 530 can also perform the step of establishing a touchpad coordinate system 710 relative to the touchpad 591 to serve as a reference for the track data. In this step, the microcontroller 530 can mathematically place the touchpad coordinate system 710 at a particular location relative to the touchpad 591. The microcontroller 530 (or the processor 932 on the eyewear device 100) can perform the steps of detecting the length of the segment 521 and calculating the heading for the segment 521 relative to the touchpad coordinate system 710.

In some implementations, the eyewear device 100 includes a projector 150 (FIG. 2B) that is configured and positioned to project the virtual object 700 onto the display 650, which may be at least one lens assembly (e.g., an optical element 180A, 180B) of the eyewear device 100, as described herein. AS shown in FIG. 8, the projector 150 may also be configured to project the physical environment 20, a number of candidate objects, the cursor 661, and the virtual object 700.

The eyewear device 100 in some implementations, receives the course data from the ring 500 in near real time and in accordance with programming instructions (referred to herein as a virtual object manipulation system program) stored in the memory 934, performs the step of displaying the virtual object 700 in a second location on the display 650 in a semi-transparent layer superimposed on top of the physical environment 20. The path of the virtual object 700 is based on the motion data being received in near real time from the ring 500.

The virtual object manipulation system 1000 may be used, of course, to select and move a number of different virtual objects. When the process is completed for a first virtual object 700, the system 1000 is configured to repeat the process, if desired, for a subsequent virtual object.

The IMU 572 inside the ring 500 is collecting motion data when the ring 500 is in motion along the course 610. The motion data includes information about the location, orientation, motion, heading, or a combination thereof of the ring 500 at each of a plurality of locations along the course 610. In some implementations, the ring 500 in accordance with programming instructions stored in the memory 540, performs the step of placing (mathematically) an origin of a three-dimensional coordinate system 710 on the display 650. In this aspect, the IMU 572 establishes zero coordinates (0, 0, 0) at the origin. The accelerometer element of the IMU 572 collects linear acceleration data (relative to the coordinate system 710) for each of the plurality of locations along the course 610. The ring 500 (or the eyewear device 100) in accordance with programming instructions, then performs the step of computing a second position (in three coordinates: x, y, z) for each of the plurality of locations along the course 610. In this aspect, the acceleration data collected by the IMU 572 can be used to calculate the position (x, y, z) of the ring 500 at each location along the course 610.

Any of the functionality described herein for the eyewear device 100, the ring 500, the mobile device 890, and the server system 998 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF)

and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A virtual object manipulation system, comprising:
   a handheld device comprising an inertial measurement unit and an input device;
   an electronic eyewear device in communication with the handheld device, the eyewear device comprising a processor, a memory, and a display;
   a virtual object manipulation system program stored in the memory of the eyewear device, wherein execution of the program by the processor configures the eyewear device to perform functions exclusive of the handheld device, including functions to:
   detect a start input from the input device;
   in response to the start input, collect motion data from the inertial measurement unit;
   based on the motion data, define a course traveled by the handheld device in motion starting from a start location in a physical environment;
   place mathematically on the display an origin based on the start location, using the origin to establish a three-dimensional coordinate system, such that the course is defined relative to the three-dimensional coordinate system,
   present on the display a cursor at a cursor location in apparent motion along a path that is correlated with the course, wherein the cursor is presented as an overlay relative to the physical environment and relative to one or more candidate virtual objects;
   detect a selection input from the input device;
   in response to the selection input, select a virtual object from among the one or more candidate virtual objects based on the cursor location and discontinue the function to present the cursor;
   present on the display a copy of the virtual object and a selection highlight associated with the copy, wherein the copy and the selection highlight are presented together at a location spaced apart relative to the one or more candidate virtual objects;
   present on the display the copy and the selection highlight in apparent motion along the path;
   detect a stop input from the input device; and
   in response to the stop input, present the copy and the selection highlight at a final location and discontinue the function to collect motion data.

2. The system of claim 1, wherein the input device comprises a touchpad sized and shaped to conform to an outer surface of the handheld device,
   wherein the function to detect the start input comprises a function to detect the start input relative to the touchpad,
   wherein the function to detect the selection input comprises a function to detect the selection input relative to the touchpad,
   wherein the function to detect the stop input further comprises a function to detect the stop input relative to the touchpad.

3. The system of claim 2, wherein the start input comprises a finger contact with the touchpad for a predetermined contact duration, and wherein the stop input comprises a finger release from the touchpad.

4. The system of claim 1, wherein the selection input comprises an action selected from the group consisting of:
   a finger release from the input device,
   a finger release from the input device followed by a single tap, a finger release from the input device followed by a series of multiple taps during a predetermined series duration, and a finger release from the input device followed by a subsequent finger contact for a predetermined duration.

5. The system of claim 1, wherein the functions further comprise functions to:

present on the display at least a portion of the path relative to the copy of the selected virtual object.

6. The system of claim 1, wherein the functions further comprise functions to:

present on the display a highlight associated with the selected virtual object.

7. The system of claim 1, wherein the functions further comprise functions to:

detect a subsequent selection input associated with the input device;

select a subsequent virtual object from among the one or more candidate virtual objects and discontinue the function to present the copy and the selection highlight; and present on the display the subsequent virtual object in apparent motion along the path.

8. A method of manipulating a virtual object, the method comprising:

establishing communication between an electronic eyewear device comprising a processor, a memory, and a display, and a handheld device comprising an inertial measurement unit and an input device;

using a virtual object manipulation system program stored exclusively in the memory of the eyewear device, detecting a start input from the input device;

in response to the start input, collecting motion data from the inertial measurement unit;

based on the motion data, defining a course traveled by the handheld device in motion starting from a start location in a physical environment;

placing mathematically on the display an origin based on the start location, using the origin to establish at three-dimensional coordinate system, such that the course is defined relative to the three-dimensional coordinate system;

presenting on the display a cursor at a cursor location in apparent motion along a path that is correlated with the course, wherein the cursor is presented as an overlay relative to the physical environment and relative to one or more candidate virtual objects;

detecting a selection input from the input device;

in response to the selection input, selecting a virtual object from among the one or more candidate virtual objects based on the cursor location and discontinuing the process of presenting the cursor;

presenting on the display a copy of the virtual object and a selection highlight associated with the copy, wherein the copy and the selection highlight are presented together at a location spaced apart relative to the one or more candidate virtual objects;

presenting on the display the copy and the selection highlight in apparent motion along the path;

detecting a stop input from the input device; and in response to the stop input, presenting the copy and the highlight at a final location and discontinuing the process of collecting motion data.

9. The method of claim 8, wherein the input device comprises a touchpad sized and shaped to conform to an outer surface of the handheld device, the method further comprising:

detecting the start input relative to the touchpad;

detecting the selection input relative to the touchpad; and detecting the stop input relative to the touchpad.

10. The method of claim 8, further comprising:

presenting on the display a highlight associated with the selected virtual object.

11. The method of claim 8, further comprising:

detecting a subsequent selection input associated with the input device;

selecting a subsequent virtual object from among the one or more candidate virtual and discontinuing the process of presenting the copy and the selection highlight; and presenting on the display the subsequent virtual object in apparent motion along the path.

12. A non-transitory computer-readable medium storing program code which, when executed, is operative to cause an electronic processor coupled to an electronic eyewear device to perform steps exclusive of a handheld device, comprising the steps of:

establishing communication between an electronic eyewear device comprising the electronic processor, a memory, and a display, and the handheld device comprising an inertial measurement unit and an input device;

detecting a start input from the input device;

in response to the start input, collecting motion data from the inertial measurement unit;

based on the motion data, defining a course traveled by the handheld device in motion starting from start location in a physical environment;

placing mathematically on the display an origin based on the start location, using the origin to establish a three-dimensional coordinate system, such that the course is defined relative to the three-dimensional coordinate system;

presenting on the display a cursor at a cursor location in apparent motion along a path that is correlated with the course, wherein the cursor is presented as an overlay relative to the physical environment and relative to one or more candidate virtual objects;

detecting a selection input from the input device;

in response to the selection input, selecting a virtual object from among the one or more candidate virtual objects based on the cursor location and discontinuing the step of presenting the cursor;

presenting on the display a copy of the virtual object and a selection highlight associated with the copy, wherein the copy and the selection highlight are presented together at a location spaced apart relative to the one or more candidate objects;

presenting on the display the copy and the selection highlight in apparent motion along the path;

detecting a stop input from the input device; and in response to the stop input, presenting the copy and the selection highlight at a final location and discontinuing the process of collecting motion data.

* * * * *